United States Patent [19]

Fracas et al.

[11] Patent Number: 5,422,741
[45] Date of Patent: Jun. 6, 1995

[54] MACHINE FOR PRODUCING PHOTOGRAPHIC COLOR PRINTS FROM BOTH IMAGES CAPTURED ON FILM AND DIGITALLY ENCODED IMAGES

[75] Inventors: Franco Fracas, Pordenone; Eni Scodellaro, Spilimbergo, both of Italy

[73] Assignee: San Marco Imaging S.r.l., Veneto, Italy

[21] Appl. No.: 220,875

[22] Filed: Mar. 31, 1994

[30] Foreign Application Priority Data

Apr. 1, 1993 [IT] Italy ................. PN93A022

[51] Int. Cl.⁶ .............................................. H04N 1/29
[52] U.S. Cl. .................................... 358/527; 355/40
[58] Field of Search ................. 358/527, 485, 487; H04N 1/04, 1/29; 355/38, 39, 40, 46, 77

[56] References Cited

U.S. PATENT DOCUMENTS 4,656,525 4/1987 Norris ................... 358/532
4,712,909 12/1987 Oshikoshi ............... 355/40
4,742,375 5/1988 Kogane et al. ........... 355/40
5,083,154 1/1992 Terashita et al. ........ 355/38

Primary Examiner—Edward L. Coles, Sr.
Assistant Examiner—Kim Yen Vu
Attorney, Agent, or Firm—Wenderoth, Lind & Ponack

[57] ABSTRACT

A machine produces photographic color prints both from images captured on film and from digitally encoded images. A conventional machine used to make color prints from images on film is provided with a one-line cathode ray tube (7 or 7a or 7b) positioned along the path followed by a strip of light-sensitive paper (31) from a supply roll (3) to a set of chemical treatment baths (60), preceding or following a printing surface (29). A projecting head (71) of the one-line cathode ray tube generates a pencil-thin line comprising a high number of pixels in a notably broad range of colors. The single lines are emitted gradually and in ordered succession by the projecting head (71), impacting on a corresponding length of the light-sensitive paper (31) as it advances across the head, thus generating an image of high definition and chromatic fidelity directly on the light-sensitive surface.

1 Claim, 1 Drawing Sheet

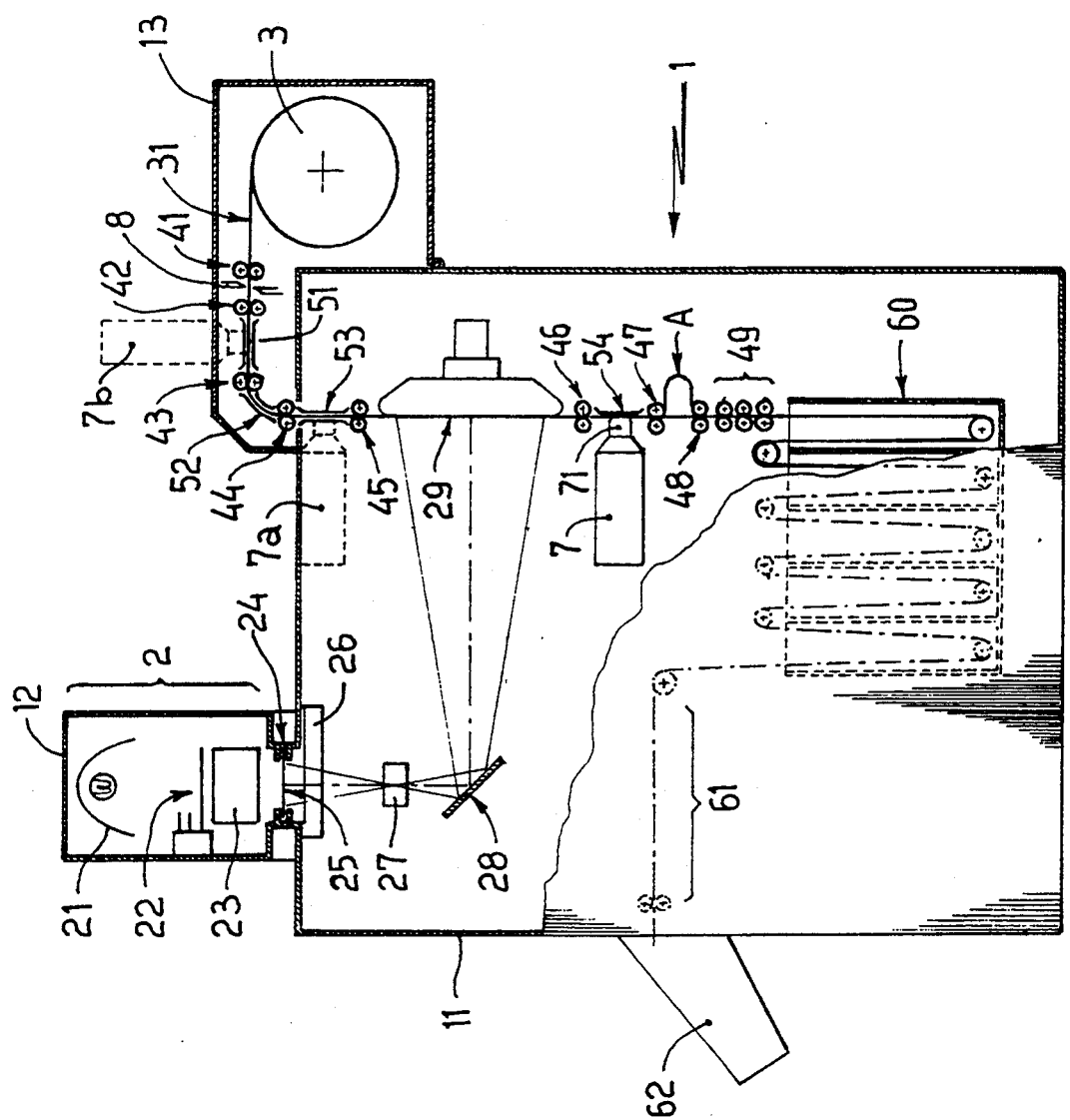

MACHINE FOR PRODUCING PHOTOGRAPHIC COLOR PRINTS FROM BOTH IMAGES CAPTURED ON FILM AND DIGITALLY ENCODED IMAGES

BACKGROUND OF THE INVENTION

The present invention relates to a photographic printing machine, and more exactly an apparatus by means of which both photographic images and digitally encoded images can be printed on light-sensitive paper. The art field of photography embraces printing machines by which images are projected from film onto discrete strips of light-sensitive paper. The exposed paper then passes through a succession of chemical treatment baths to be developed, and thereafter into a drying chamber, whereupon the finished photographs are ejected from the machine automatically.

Devices have also been developed for the printing of digitally encoded images obtained with video cameras or generated using computer graphics or other conventional systems and recorded on convenient storage media such as magnetic tape or magnetic or optical disk, typically the familiar CD. The digital information is relayed by a suitable electronic processor to a cathode ray tube, and the entire image reproduced and projected by means of appropriate optical devices onto the light-sensitive paper, which is then processed in the traditional way. Conventional systems for reproducing digitally encoded images normally make use of black-and-white cathode ray tubes which, in order to generate the full image, must project a succession of three primary black and white images. These monochrome images are the product of a previous filtering operation executed optically or electronically in the three primary colors, and must be reconverted when projected onto the light-sensitive paper with the corresponding colored filters, suitably piloted and controlled in conjunction with the relative exposure times by an electronic processor.

U.S. Pat. No. 4,742,375 discloses a solution in which the optical and electronic printing units in question can be either embodied separately and thus applied individually to a basic unit for developing the light-sensitive paper, or incorporated together with the developing unit into one assembly to create a single combination machine. Recent years have also witnessed the appearance of a special one-line cathode ray tube which, instead of generating a full raster image comprising a plurality of transverse lines in the manner of a flared cathode ray tube, emits a single transverse line of the image ensuring exact reproduction of the relative colors and impacting directly on the light-sensitive paper. Thus, by traversing the light-sensitive paper gradually over the light-emitting slot of the one-line cathode ray tube, it becomes possible to obtain progressive transfer of a plurality of lines, generated directly, i.e. without the use of other projection devices and without filtering in the three primary colors, which ultimately combine to make up the full image. Naturally enough, the system will also include suitable devices and means for controlling and coordinating the line-by-line output of the cathode ray tube and the movement of the light-sensitive paper feed mechanism, with the end of ensuring that a correct final image is obtained.

The prior art now encompasses a photographic printing machine equipped with this one-line type of cathode ray tube, though such a machine will produce prints only from digitally encoded images.

Whilst the patented machine disclosed in the aforementioned U.S. Pat. No. 4,742,375 affords certain advantages, insofar as the reproduction of photographic images both from film and from digital sources is performed by a single unit, it is nevertheless significantly complex in embodiment and therefore costly, given the need for two distinct units: one for the projection of images from film, and another for the projection of digitally encoded images. Moreover, the unit by which digitally encoded images are reproduced requires a relative optical projection assembly comprising a lens, together with the set of three colored filters, and therefore the various means and devices for controlling and coordinating the system overall, and also the conventional black-and-white cathode ray tube utilized, are of not inconsiderable dimensions. Generally considered, therefore, the machine is notably complex and costly, and discernibly cumbersome.

OBJECTS OF THE INVENTION

The object of the present invention is to overcome the drawbacks and limitations of the various prior art solutions in question by providing a photographic printing machine such as will produce color prints both from film and from digitally encoded images. These and other objects are realized according to the invention in a machine as characterized in the appended claims.

BRIEF DESCRIPTION OF THE DRAWING

The features and advantages of the invention will now be described in detail, strictly by way of example, with reference to the accompanying drawing, which provides a schematic illustration of a machine of the present invention viewed in side elevation with certain parts cut away.

DETAILED DESCRIPTION OF THE EMBODIMENTS

Referring to the drawing, it will be observed initially that the basic structure of a typical machine 1 for making photographic prints from images captured on film comprises a main casing 11 and mounted to the top of this same casing, a smaller casing 12 serving to house an image projector 2 composed conventionally of a light source 21, a set of colors filters 22, a condenser 23 and a device 24 supporting film 25. Positioned internally of the main casing 11 is an image analyzer 26, a lens assembly 27 incorporating a shutter, a mirror 28 disposed at 45°, and a printing surface 29. A further casing 13 houses a roll 3 of light-sensitive paper 31 in continuous strip format, which is decoiled and fed toward the printing surface 29 by successive pairs of pinch rollers 41, 42, 43, 44 and 45, and if appropriate, by fixed guides 51, 52 and 53. The paper is carried away from the printing surface 29 by similar pairs of pinch rollers 46, 47 and 48 and directed thereafter by further clustered pairs of pinch rollers 49 into a set of chemical treatment baths 60, from which it passes through a drying chamber 61 before being deposited finally in a collection chute 62.

The continuous strip of light-sensitive paper 31 will be cut by a suitable guillotine 8 into discrete strips of a selected length for exposure either on the printing surface 29, in the event that the machine is used in the traditional manner for the reproduction of images from film 25, or at a station occupied by a one-line cathode ray tube 7, as will be described in due course. In a first possible embodiment of the machine indicated by the accompanying drawing, the one-lines cathode ray tube 7 is shown in bold line, whilst further possible embodiments are suggested by thin dash phantom lines. Similarly, the path followed by the discrete lengths of light-sensitive paper 31 from the roll 3 down to the entry point of the chemical treatment baths 60 is indicated in bold lines, whereas the remaining stretch to the collection chute 62 is suggested schematically by the dash and dot phantom line.

In the first embodiment mentioned, the one-line cathode ray tube 7 is positioned beyond the printing surface 29 in relation to the feed direction of the paper, its projecting head 71 interposed between the pair of pinch rollers 46 following the printing surface 29 and the pair of pinch rollers 47 next in succession, directly adjacent to the light-sensitive face of the advancing strip of paper 31, which is maintained in the correct position by a suitable guide 54 (or by equivalent means such as a roller) offered to and interacting with the reverse side of the paper.

The operation of the machine 1 will now be described briefly, insofar as it relates to the traditional type of printing from images captured on film 25.

First to be activated are the pairs of pinch rollers denoted 41 and 42, which proceed to advance a suitable length of the light-sensitive paper 31 decoiled from the roll 3. Once the desired length has run through, the rollers cease rotation and the guillotine 8 strikes to separate a discrete strip, which is again taken up by the pairs of rollers 42, 43, 44 and 45 and advanced toward the printing surface 29, maintained in position both by the rollers and by the guides 51, 52 and 53. The device of which the printing surface 29 forms a part is now activated in such a way as to position the discrete length of light-sensitive paper 31 correctly when brought to a standstill and allow the projection of the image from the film 25 in the normal manner. With the image duly transferred, the device affording the printing surface 29 is activated again to advance the exposed strip of light-sensitive paper toward the successive pairs of pinch rollers 46, 47 and 48. In this instance, the velocity at which the paper is directed away from the printing surface 29 and through the pairs of pinch rollers 46, 47 and 48 preceding the clustered pairs of pinch rollers 49 is greater than its velocity subsequently through the chemical treatment baths 60 and the drying chamber 61, thus explaining the inclusion of the cluster. In effect, the pairs of pinch rollers 49 in question rotate at a peripheral velocity matched to the feed velocity selected for the passage of the discrete strips of light-sensitive paper through the successive stages of processing, and are associated with the relative drive shafts, in a conventional manner, together with suitable means such as will allow the strips of paper received at the greater velocity to be taken up progressively by the cluster 49 and advance smoothly toward the ejection point.

Having thus described the operation of the machine when used in the normal and traditional manner for producing photographic prints from film, attention may now be given to the mode of operation when producing prints from digitally encoded images.

In this instance, the digital images are relayed to the one-line cathode ray tube 7 from a suitable electronic unit by which both the tube itself and the devices operating in conjunction with the tube are controlled and monitored.

Briefly, the one-line cathode ray tube 7 is piloted in such a way that the projecting head 71 will generate a plurality of lines in ordered succession, each formed by the progressive end-to-end emission of a relative plurality of pixels already in the correct colors for immediate reproduction, as intimated previously.

The ultra-thin line emitted from the projecting head 71 impacts directly on the light-sensitive surface of the paper 31 in such a way that a corresponding ultra-thin line is printed on this same surface.

As the successive lines making up the overall image are emitted progressively by the projecting head 71, the strip of light-sensitive paper 31 advances gradually and with accurately controlled movement in a direction perpendicular to the plane of the emission from the projecting head 71. The effect is to obtain an ordered and regular exposure of the plurality of lines which ultimately form the complete printed rectangular image. With the one-line cathode ray tube 7 in the position of the first embodiment illustrated, the continuous strip of light-sensitive paper 31 is decoiled by the relative pairs of pinch rollers 41 and 42 and cut to discrete strips of the desired length by the guillotine 8 in the manner already described. The discrete strip is then carried forward to the device affording the printing surface 29, in this case being allowed straight through to the pair of pinch rollers 46 immediately beyond and from thence to the electronic print station, where its leading edge penetrates between the projecting head 71 of the one-line cathode ray tube 7 and the respective guide 54. At this point, the velocity of the advancing strip of light-sensitive paper 31, as determined by the pairs of pinch rollers 41, 42, 43, 44, 45 preceding the device affording the printing surface 29, by this same device and by the subsequent pairs of rollers 46, 47 and 48, is matched immediately to the electronic print speed.

The motion transmitted to the strip of light-sensitive paper 31 by the various elements mentioned above can be continuous, or alternatively might be intermittent, in which case all of the components in question, or at least the pairs of pinch rollers denoted 46, 47 and 48, will be appropriately indexed in rotation by a suitable stepping motor, and, naturally enough, connected to the relative source of motion by way of precision linkages such as will prevent even the slightest irregularities in the distance between the successive lines projected sequentially onto the discrete strip of light-sensitive paper 31, which clearly would degrade the quality of the image ultimately obtained.

In the case of the electronic printing system using a one-line cathode ray tube 7 of the type in question, the rate at which the printed image is composed, hence the velocity at which the strip of light-sensitive paper 31 advances, may in some instances be less than its subsequent velocity through the chemical treatment baths 60 to the point of ejection. It follows therefore that if the discrete strip of light-sensitive paper 31 were to pass from the final pair of rollers 48 of the printing station directly to the cluster of rollers 49 at the entry to the chemical treatment baths 60, the immediate take-up at a greater velocity would clearly disallow correct operation of the system as a whole. To avoid such a situation, the pair of pinch rollers 48 in question is positioned at a given distance beyond the preceding pair of rollers 47 and controlled in such a manner as will allow the two sections of the feed path to be decoupled temporarily, with the result that the portion of the strip of light-sensitive paper 31 emerging from the preceding rollers 47 can slacken to form a loop A, ensuring a smooth and correct feed. The operation of the entire machine 1 has thus been fully described, with reference both to the familiar type of use whereby images are reproduced optically from photographic film and to the type of use whereby digitally encoded images are reproduced electronically employing a one-line cathode ray tube 7 occupying the position of the first embodiment aforementioned, beyond the printing surface 29 in the feed direction. As already intimated, the one-line cathode ray tube 7 might be positioned not only as in the first embodiment illustrated, but alternatively, for example, preceding the printing surface 29 along the path followed by the light-sensitive paper 31, whether within or externally of the main casing 11, between the supply roll 3 and the printing surface 29, as indicated by phantom lines in the drawing.

In a second possible embodiment the one-line cathode ray tube 7, denoted 7a in this instance, is disposed inside the main casing 11, occupying a position between the pairs of pinch rollers denoted 44 and 45, whilst in a third possible embodiment the tube, denoted 7b, is positioned externally of the supply roll casing 13, between the pairs of pinch rollers denoted 42 and 43. Naturally, the machine will be equipped with a suitable electronic processor serving both to oversee the usual reproduction of images from film and to coordinate and control the various devices and components required to enable the two different types of use envisaged. In conclusion, the machine according to the invention affords considerable and varied advantages, which may now be summarized.

The particular embodiment described and illustrated permits of producing high quality color prints on light-sensitive paper both from photographic film and from digitally encoded images, using a single apparatus that features simplicity and economy in construction from every standpoint, benefiting the manufacturer, the maintainer and the end user alike.

Another particular aspect of practical benefit is that the end user no longer has to employ two dissimilar and separate units each designed to produce one relative type of print, but can commission a single unit for the reproduction of both types of image in question, which in addition is notably compact and therefore requires less space in which to operate. With a machine packaged as a single unit, moreover, the user is more swiftly and easily familiarized with its use.

Evidently, variations might be applied to the machine according to the present invention without by any means abandoning the scope of the foregoing specification and the references to the accompanying drawing, neither straying from within the bounds of protection afforded by the claims appended.

We claim:

1. A photographic printing machine for producing color photographs generated both from images captured on film and from digitally encoded images, comprising:

a machine for producing color photographs from images on film housed within a casing and comprising a supply roll of a strip of light-sensitive paper, a light-sensitive paper path, an optical projector by which images are thrown from the film onto the strip of light-sensitive paper as it is decoiled continuously from the supply roll, a guillotine device for cutting the strip of light-sensitive paper into discrete strips, a printing surface, pairs of pinch rollers and guides for positioning the discrete strips on the printing surface, further pairs of pinch rollers for directing the discrete strips forward after printing, a group of chemical treatment baths having an entry point along the path of the light-sensitive paper and into which the discrete strips are directed, a drying chamber receiving the discrete strips from the group of chemical treatment baths and a collection chute into which the discrete strips are ultimately deposited;

a one-line cathode ray tube positioned along the path of the light-sensitive paper between the supply roll and the entry point to the group of chemical treatment baths, preceding or following the printing surface and internally or externally of the casing, the one-line cathode ray tube having a projecting head for generating a single pencil-thin line of light formed by a progressive ordered end-to-end emission of a number of pixels in a range of colors and being disposed in close proximity to the exposed surface of the light-sensitive paper;

a guide means for maintaining one of the discrete strips of light-sensitive paper in a position against the projecting head and a drive means for progressively advancing the one of the discrete strips of light-sensitive paper with precision movement, continuously or by minimal uniform increments, perpendicularly to a plane of emission of the one-line cathode ray tube;

whereby an image of high definition and chromatic fidelity can be collectively and directly formed by the progressive emission of a plurality of single lines of light by the projecting head in ordered succession and in combination with precision movement generated by the drive means, producing a corresponding plurality of accurately equispaced lines on an exposed surface of the one of the discrete strips of light-sensitive paper; and a suitable processor controlling the analysis of images captured on film for normal photographic reproduction, and controlling and coordinating operation of said machine, said one-line cathode ray tube, and said drive means for photographic reproduction and for electronic reproduction.

* * * * *